UNITED STATES PATENT OFFICE.

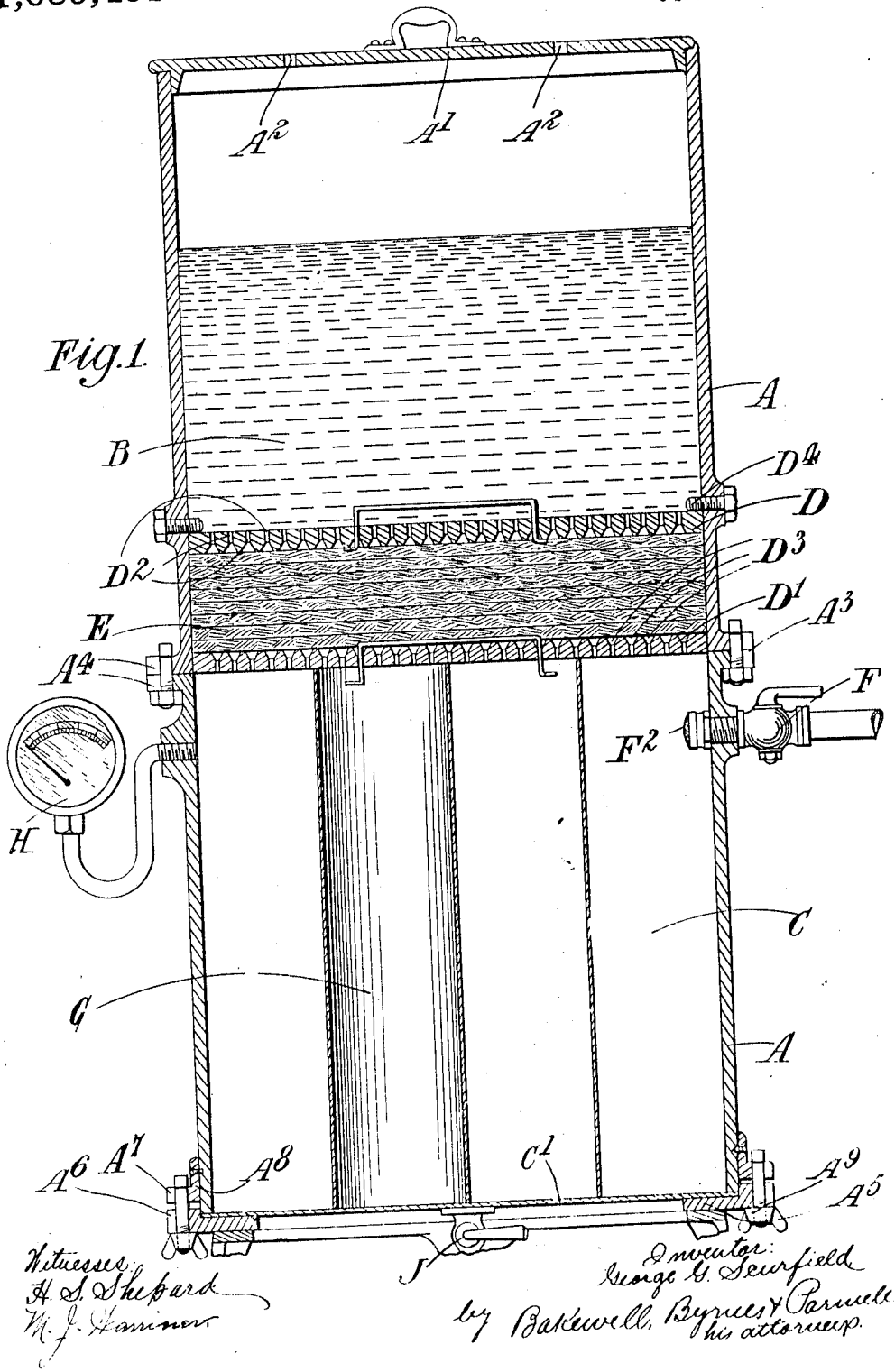

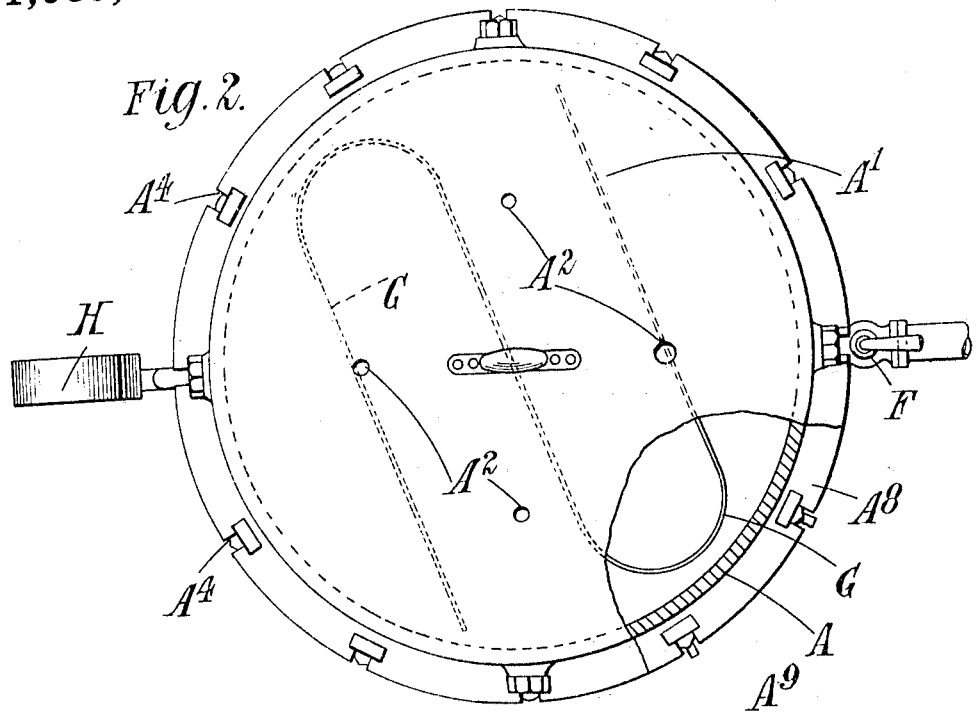
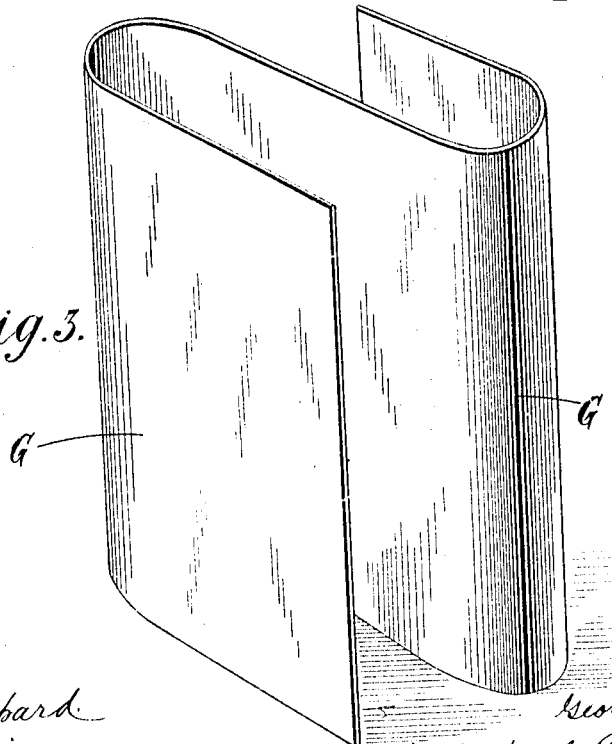

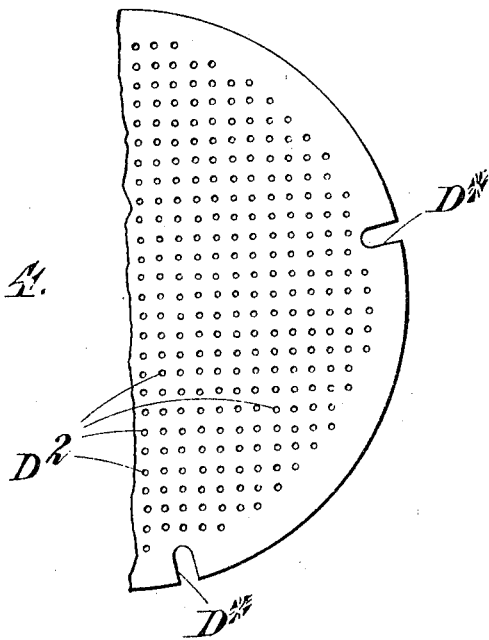
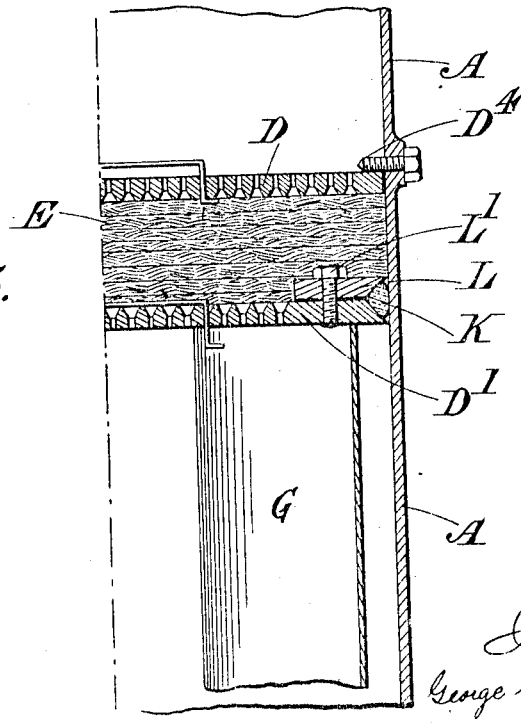

GEORGE GOUTHWAITE SCURFIELD, OF CARLISLE, ENGLAND.

FILTER FOR OIL, GREASE, AND OTHER SUBSTANCES.

1,039,451.  Specification of Letters Patent.  Patented Sept. 24, 1912.

Application filed April 9, 1909. Serial No. 488,790.

*To all whom it may concern:*

Be it known that I, GEORGE GOUTHWAITE SCURFIELD, a subject of the King of England, residing at Carlisle, Cumberland, England, have invented certain new and useful Improvements in Filters for Oil, Grease, and other Substances, of which the following is a specification.

This invention is for improvements in or relating to filters for oil, grease and other substances of the type wherein upper and lower vessels, divided by a filtering medium are employed and its object is to provide a filter which shall be quick and efficient in action and which can be readily cleaned.

A novel feature of this invention as applied to the filtering of oil or grease consists in providing apparatus for thinning and warming the oil or grease by the use of steam that is passed through it prior to filtering.

Another feature consists in providing apparatus for the generation of steam in or the admission of steam direct to the receiving chamber, passing part of such steam from the chamber through the oil or grease to thin and warm it prior to filtering and condensing the remainder in the receiving chamber to create a partial vacuum.

In the accompanying drawings, which illustrate one method of carrying out this invention:—Figure 1 is a central vertical section of the filter; Fig. 2 is a plan of the same; Fig. 3 is a perspective view of a support employed within the filter; Fig. 4 shows a portion of one form of perforated plate in plan, and Fig. 5 is a section through part of an alternative form of apparatus.

Like letters indicate like parts throughout the drawings.

The apparatus comprises a casing A which for convenience may be made in two or more pieces. This casing is divided into two chambers separated by two perforated plates D $D^1$ between which is placed the filtering medium E. This may be of felt, flannel, or other convenient material. The chamber B is closed by a cover $A^1$ having perforations $A^2$ or other convenient device for placing the chamber in free communication with the atmosphere. Communicating with the upper portion of the lower chamber is a cock F for the admission of exhaust or live steam.

The operation of this apparatus is as follows:—The lubricant is placed in the chamber B' and steam is admitted to the chamber C. Some of this will find its way through the filtering medium E to the upper chamber and thus coming into direct contact with the lubricant will thin the latter. When sufficient steam has been admitted, the cock F is shut off and condensation takes place in the chamber C resulting in the production of a partial vacuum, and the lubricant in the chamber B being subject to the pressure of the atmosphere is forced through the filtering medium E. The filter is designed in such a manner that it is impossible to get any excessive pressure in it since the steam which is used for warming the oil has the oil above acting as a safety valve preventing accumulation of pressure while the collapsing pressure due to the vacuum used for assisting the oil through the pads is of course automatically limited to that of the atmosphere; for these reasons the structural design of the filter can be comparatively light. The plates D $D^1$ are perforated as shown at $D^2$, and these perforations are enlarged or countersunk, as shown at $D^3$ on that side which is toward the filtering medium. This allows the lubricant passing through the orifices $D^2$ to come into direct contact with a larger area of the filtering medium than would otherwise be the case without decreasing unnecessarily the strength of the plates and the efficiency and speed of action are thereby greatly enhanced. It should be noted that the filtering medium which may be of felt or other suitable substance is sufficiently stiff to bridge the countersunk holes $D^3$ so that a considerable area of the filtering medium thus lies clear of the plates and can be utilized for the passage of the substance to be filtered. In order that the apparatus may be readily cleaned, the casing A is conveniently made circular and may be divided at $A^3$ in which case the two parts may be secured together by bolts that engage opposed flanges $A^4$. The bolts, instead of entering orifices in these flanges, may engage in slots so that as soon as they are loosened they can be withdrawn laterally. The plate $D^1$ rests on the loose support G which also stays both it and the bottom $C^1$ against collapse when the vacuum is formed in the receiving chamber C. This support G is conveniently S-shaped, as shown in Fig. 3, and being loose does not interfere with the cleaning of the parts. The upper perforated plate D is kept in place by screws $D^4$ or similar devices.

By removing the cover $A^1$ and withdrawing the screws $D^4$, the plates D $D^1$ with the filtering medium may be lifted out, and by removing the upper portion of the casing from the lower portion, when made in separate parts, ready access may be had to all of the parts, or again, one or both plates may be made with slots $D^*$ in the circumference, as shown in Fig. 4, so that by turning them slightly so as to bring the slots in register with the screws $D^4$ one or both may be lifted out without disturbing the bolts or studs. The bottom $C^1$ may be made in one piece, or if required to be used with a stove or heater below it for the purpose hereinafter described, it may be made of very thin material and conveniently supported by a loose flange $A^5$ that is recessed to take the aforesaid thin bottom as shown and has at its edge a series of holes or slots $A^6$ that register with holes or slots $A^7$ in a flange $A^8$. Bolts and nuts $A^9$ are entered in the slots $A^6$ $A^7$ and serve to secure the bottom in place. To detach the bottom, where slots are used in place of holes, it is only necessary to loosen the nuts, when the bolts, with the nuts still thereon, can be removed laterally. A compound gage H for showing pressure and vacuum may be fitted to the chamber C, and a cock J affords means for drawing off the filtered lubricants.

If desired to insure that no liquid passes over the edge of the filtering medium, the top plate or bottom plate, or both, can be fitted with packing, as shown in Fig. 5; also in some cases it may be more convenient to make the casing in one piece instead of two, as also shown in Fig. 5. The above mentioned packing K is placed around the edge of the plate and secured between the plate and a clamping ring L, or it may be fitted into a V-shaped recess around the edge of the plate or plates. The edges of the plate or plates and clamping rings are oppositely beveled so as to expand the packing against any irregularity in the sides of the casing when pressure is put on the ring or rings. These rings are secured by bolts $L^1$ that apply the requisite pressure.

Another method of operation instead of admitting steam to the chamber C, is to admit a small quantity of water to this chamber and generate the steam in the chamber itself by the application of heat from beneath by gas or other suitable means. In such cases the cock F is used for admitting the water from which the steam is generated and the whole apparatus will act as already described, the vacuum being formed by turning off or removing the source of heat. The cock F is itself fitted with a straining device $F^2$, as shown, to prevent impurities from getting into this chamber either from the steam or from the water from which it is generated.

What I claim as my invention and desire to secure by Letters Patent is:—

1. A filter of the character described, comprising a receptacle having an upper space or chamber for the liquid to be filtered, a lower steam space or chamber, a perforated plate having a plurality of slots in its outer edge and forming the bottom of the liquid space or chamber, a plurality of stops extending inwardly from the wall of the upper chamber for retaining the plate in position, said slots being arranged to be brought into register with said stops to permit the removal of said plate, another perforated plate forming the top of the steam space or chamber, and a plurality of superposed filter pads between said plates, said pads and plates being capable of limited vertical movement in the chamber, the perforations in said plates and the filtering pads forming the only path for the liquid from the upper to the lower chamber; substantially as described.

2. A filter of the character described, comprising a receptacle having an upper space or chamber for the liquid to be filtered, a lower steam space or chamber, a perforated plate having a plurality of slots in its outer edge and forming the bottom of the liquid space or chamber, a plurality of stops extending inwardly from the wall of the upper chamber for retaining the plate in position, said slots being arranged to be brought into register with said stops to permit the removal of said plate, another perforated plate forming the top of the steam space or chamber, and a plurality of superposed filter pads between said plates, said pads and plates being capable of limited vertical movement in the chamber, together with means for creating a partial vacuum in the steam space or chamber; substantially as described.

3. A filter of the character described, comprising a receptacle having an upper space or chamber for the liquid to be filtered, a lower steam space or chamber, a perforated plate forming the bottom of the liquid space or chamber, another perforated plate forming the top of the steam space or chamber, and a plurality of superposed filter pads between said plates, said pads and plates being capable of limited vertical movement in the chamber, one of said plates having a peripheral expansion packing, substantially as described.

In testimony whereof I have signed my name to this specification in the presence of two subscribing witnesses.

GEORGE GOUTHWAITE SCURFIELD.

Witnesses:
HARRY ANTHONY PLCONA MAWSON.
WILLIAM PATERSON.